UNITED STATES PATENT OFFICE.

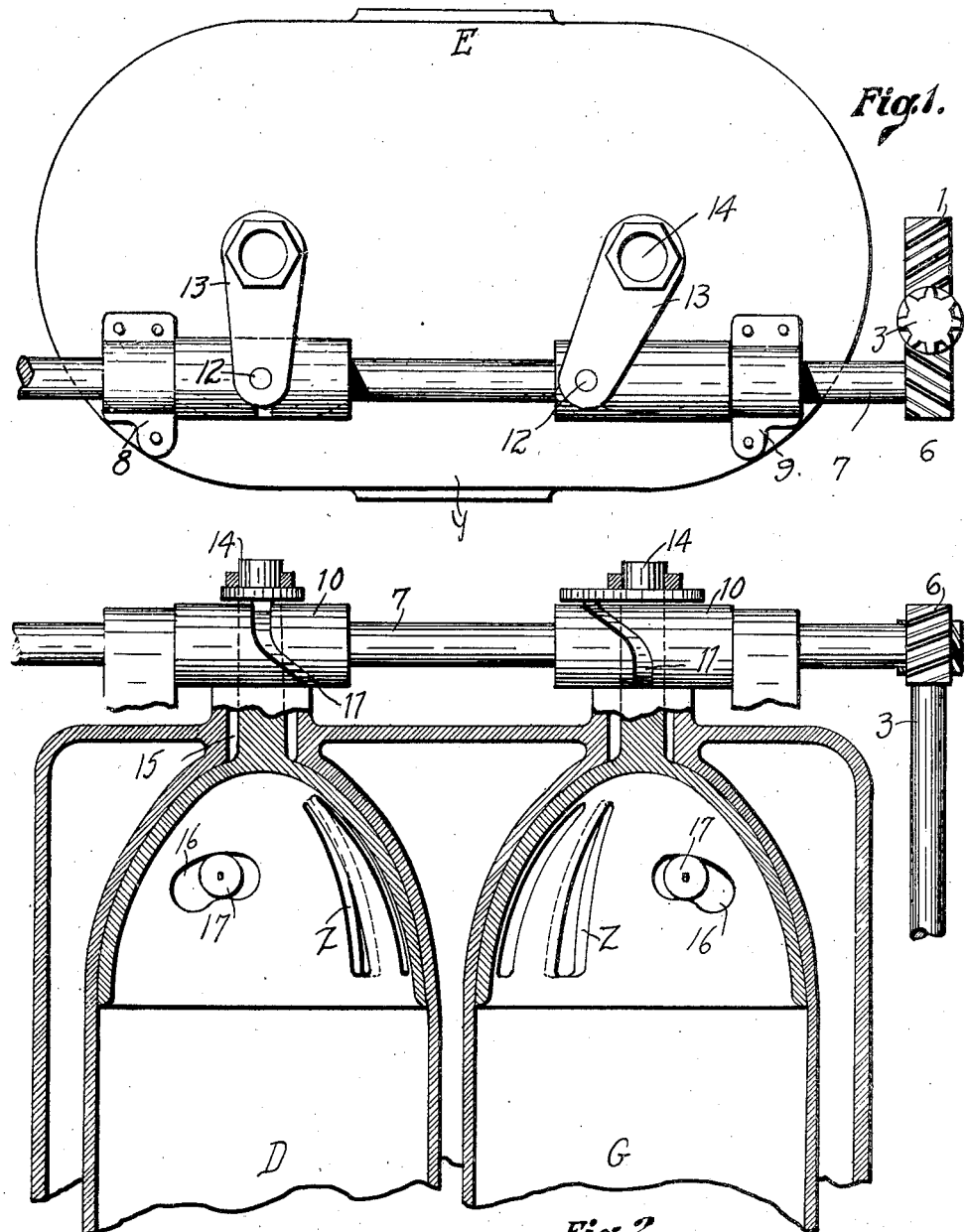

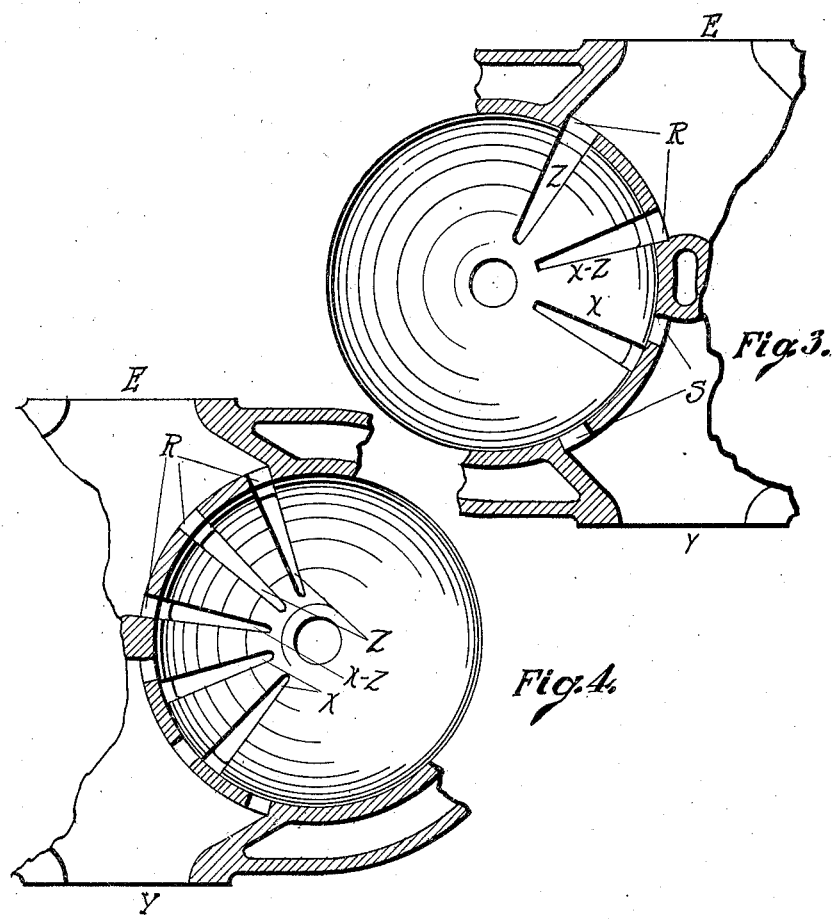

ROBERT A. REYNOLDS, OF DETROIT, MICHIGAN.

INTERNAL-COMBUSTION ENGINE.

1,103,223.

Specification of Letters Patent. Patented July 14, 1914.

Application filed January 15, 1912. Serial No. 671,183.

*To all whom it may concern:*

Be it known that I, ROBERT A. REYNOLDS, a citizen of the United States, residing at Detroit, county of Wayne, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

This invention relates to internal combustion engines and has for its object, an oscillatory valve which affords a maximum port opening with a minimum friction. This is effected by the arrangement of a number of ports in the cylinder and in the valve and also by the shaping of the valve and its seat.

In the drawings:—Figure 1, is a top view of a two-cylinder engine equipped with my valve. Fig. 2, is a vertical section of the two-cylinder engine shown in Fig. 2. Fig. 3, is a plan view of my invention showing the 4 to 3 port arrangement. Fig. 4, is a plan view of my invention showing the 6 to 5 port arrangement.

A, is an engine cylinder provided with a crank case B, and a crank shaft C. The helical gear 1 is located on the end of the crank shaft C and meshes with the helical gear 2 that is on the vertical shaft 3. The vertical shaft 3 is journaled in bearings 4 and 4ᵃ that are attached to the crank case B and the cylinder A, respectively. At the top of the vertical shaft 3 is a helical gear 5 that meshes with a helical gear 6 that is fast to the counter-shaft 7 that traverses the cylinder heads and is journaled in the bearings 8 and 9, attached to the cylinder heads. I have shown my invention in connection with a two-cylinder engine, but it is not applicable only to such engines, but may be used with engines comprising any number of cylinders.

The counter-shaft 7 is driven at one-half crank shaft speed and is provided with enlarged portions, or, at the designer's option, with separate sleeves that may be forced on to the shaft and which will be called, for sake of clearness, cam members 10. Each of these cam members is provided with a cam race 11 and in this cam race runs the guide pin 12 which may be provided with a roller, if desired. The guide pin 12 is fast to the arm 13 which is also fast to the valve stem 14. The above mechanism constitutes the valve driving means, and the cam race 11 is so laid out as to give the valve stem the desired oscillation at the desired time. It will be noted that the cam race 11 extends for a part of the way around the cam member 10 in a circular path, that is, it forms a portion of a circle that goes completely around the countershaft, so that when the cam 12 travels in this portion of the race, it does not actuate the valve. The purpose of this will appear later in the specification. The design of the cam race is a mere matter of engineering calculation and, therefore, I will not take the space to give the details and the measurements necessary. Each variation of my invention would require a different lay out of the cam race.

Cylinders D and G are cast with a dome shaped head, oval in cross section, or may be cast with a hemispherical dome such as F, shown in Fig. 1. I prefer to employ the oval dome for the reason that I secure a larger port area, as it is obvious that the ports will be longer. This is especially desirable for the reason that I wish to make the ports as narrow as possible in order to lessen the arc through which the valve oscillates. The valve employed is of complementary shape to the cylinder head, being an oval dome shape in the form shown in Fig. 3 and a hemispherical dome shape in the form shown in Fig. 1. It is not necessary to lubricate this valve as the oscillation is so limited that the friction is small. However if it is desired, oil may be fed through the oil conduit 15 to the stem 14 where it will be spread by centrifugal force to all parts of the valve. The oil may be fed to the conduit 15 by any of the well known systems of lubrication in use in connection with gas engines. A slot 16 is provided in the side of the valve and through this protrudes the spark plug 17. The slot is made with a view to give the valve perfect freedom in its oscillation about the spark plug 17.

Referring to Fig. 4, the 4 to 3 port arrangement will be seen. E is the exhaust manifold and Y the intake manifold, one manifold serving two cylinders. R, R are exhaust ports in the cylinder and S, S are intake ports. Z is an exhaust port in the valve and X is an intake port in the valve. Z—X is a double-duty port, it being an exhaust port of the valve when it registers with the exhaust port R of the cylinder and an intake port when it registers with the intake port S of the cylinder. In the position shown in Fig. 4 the valve is in position to allow the cylinder to exhaust. It will be noted that by moving the valve counter-clockwise a little more than the distance of the width of the port Z all of the ports of the valve are out of registry with the ports of the cylinder. By moving the valve still further in counter-clockwise direction the port X and the port Z—X will register with the intake ports S of the cylinder, thereby opening the intake.

The modification shown in Fig. 5, operates exactly as the form shown in Fig. 4, except that the port relation of the valve and the cylinder is 5 to 6. Inasmuch as there are three exhaust ports and three inlet ports in the cylinder, and these are substantially equal in width and area to the two exhaust ports and two inlet ports in the form shown in Fig. 4, the valve operates through a somewhat smaller arc. By increasing the number of ports in this way, the arc of oscillation of the valve may be materially reduced, thereby minimizing the friction without effecting the area of the port opening. As already explained, it is quite important to use a valve shaped so that a long port opening is secured in order to increase the area of the port, so that its width may be correspondingly lessened in order to lessen the oscillation of the valve.

It will be noted, by referring to the cylinder on the left hand side of Fig. 3, that the ports of the valve and the cylinder head are substantially out of register and that at this point the cam 12 is traveling in the straight portion of the cam race 11 or that portion of the cam race which is a portion of a circle completely encircling the cam member 10. It is, therefore, apparent that the valve is not now being moved. This is the condition that exists during the explosion period and the compression period, hence the valve does not travel when it is subject to pressure so as to make it bind upon the cylinder head. This, therefore, avoids friction and is an important point. The valve is also adapted to prevent the accumulation of carbon deposits for the reason that all exposed portions of the cylinder head are swept by the valve.

What I claim is:—

In an internal combustion engine, the combination of an engine cylinder having a plurality of ports for exhausting the burnt gases and taking in the fuel, the said ports being multiplied to get port area with small width and an oscillatory valve having similarly dimensioned and arranged ports, one less in number than the ports of the cylinder, one of the ports of the valve being assigned for alternate registration with one of the inlet and one of the exhaust ports of the cylinder, substantially as described.

In testimony whereof, I, sign this specification in the presence of two witnesses.

ROBERT A. REYNOLDS.

Witnesses:
 LOTTA LEE BRAY,
 VIRGINIA C. SPRATT.

Copies of this patent may be obtained for five cents each, by addressing the "Commissioner of Patents, Washington, D. C."